United States Patent [19]
Nagasima

[11] 3,832,527
[45]*Aug. 27, 1974

[54] DEFOGGING GLASS PLATE

[75] Inventor: Takeomi Nagasima, Yokohama, Japan

[73] Assignee: Asahi Glass Company, Limited, Tokyo, Japan

[ * ] Notice: The portion of the term of this patent subsequent to July 31, 1990, has been disclaimed.

[22] Filed: Mar. 28, 1973

[21] Appl. No.: 345,528

Related U.S. Application Data
[63] Continuation of Ser. No. 206,728, Dec. 10, 1971, Pat. No. 3,749,885.

[30] Foreign Application Priority Data
Dec. 18, 1970  Japan.................... 45-126498

[52] U.S. Cl............. 219/522, 200/61.05, 219/203, 219/509, 314/235
[51] Int. Cl. .......................................... H05b 3/06
[58] Field of Search .......... 219/202, 203, 212, 522, 219/494, 509; 73/73; 340/234, 235; 200/61.04, 61.05, 61.06

[56] References Cited
UNITED STATES PATENTS

| 1,109,481 | 9/1914 | Stroud .............................. 340/235 |
| 2,064,651 | 12/1936 | Fiene .................................. 340/235 |
| 2,424,735 | 7/1947 | Boothroyd ...................... 314/235 X |
| 2,617,972 | 11/1952 | Nutter.......................... 200/61.05 X |
| 3,127,485 | 3/1964 | Violo .............................. 200/61.05 |
| 3,233,078 | 1/1966 | Siemianowsky............. 200/61.05 X |
| 3,412,326 | 11/1968 | Jones et al. ................... 340/234 X |
| 3,484,583 | 12/1969 | Shaw, Jr. .......................... 219/522 |
| 3,553,432 | 1/1971 | Livingston et al. ................. 219/522 |
| 3,749,885 | 7/1973 | Nagasima........................... 219/522 |

FOREIGN PATENTS OR APPLICATIONS

| 727,020 | 3/1955 | Great Britain ...................... 340/235 |
| 1,012,146 | 12/1965 | Great Britain.................. 340/235 |

Primary Examiner—Volodymyr Y. Mayewsky
Attorney, Agent, or Firm—Oblon, Fisher, Spivak, McClelland & Maier

[57] ABSTRACT

A defogging glass plate includes an electric heating element, such as being made of conductive films or electric resistance strips for electrically heating the glass plate, and a sensor having a pair of electrodes which are arranged in parallel with a suitable gap and which are fitted on the surface of the glass plate, for automatically controlling the application of heat to the glass plate depending on the cloudiness or visibility thereof.

2 Claims, 3 Drawing Figures

3,832,527

DEFOGGING GLASS PLATE

This is a continuation of application Ser. No. 206,728, filed Dec. 10, 1971, now U.S. Pat. No. 3,749,885.

BACKGROUND OF THE INVENTION

1. Field of the Invention

This invention generally relates to a defogging glass plate, and more particularly to a defogging glass plate having an electric resistance heating element which is automatically controlled in accordance with the amount of moisture on and hence the visibility of the glass plate.

2. Description of the Prior Art

In the past, it was known to print a glass plate with a conductive film on the surface thereof or to provide an electric heating element, such as an electric resistance strip, on a glass plate for heating the glass plate so as to prevent cloudiness of the glass plate, caused by ice, frost, fog, condensing moisture on the surface of the glass plate or the like, so as to maintain the transparency and hence visibility of the glass plate.

While somewhat satisfactory, in order to maintain the visibility of the conventional glass plates such as used in automobiles, aeroplanes, ships, other vehicles, window glass plates for buildings or other various apparatus and the like, which had an electric heating element therein, one had to continuously observe the condition of the glass plate in order to determine whether the electric heating element should be manually activated. A need existed therefore for a non-fog glass plate which could be automatically heated by an electric heating element whenever visibility could be hampered by being covered with moisture, and the like.

SUMMARY OF THE INVENTION

Accordingly, it is an object of this invention to provide a new and improved unique glass plate having an electric heating element which is automatically heated by detecting moisture and which automatically removes any cloudiness on the surface of the glass plate.

It is another object of this invention to provide a new and improved unique defogging glass plate having a stable and highly sensitive sensor for detecting moisture condensed on the surface of the glass plate.

Briefly, in accordance with this invention the foregoing and other objects are attained by the provision of a defogging glass plate which includes an electric heating element, such as conductive films or electric resistance strips for electrically heating the glass plate, and a sensor having a pair of electrodes which are arranged in parallel with a suitable gap, such as about 0.1 – 10.0 mm. and which is fitted on the surface of the glass plate, for automatically controlling the heating thereof in response to any cloudiness on the glass plate.

BRIEF DESCRIPTION OF THE DRAWINGS

Further features and advantages of this invention will become apparent upon reading the following specification in connection with the accompanying drawings wherein.

DETAILED DESCRIPTION OF THE PREFERRED EMBODIMENTS

Figure 1:
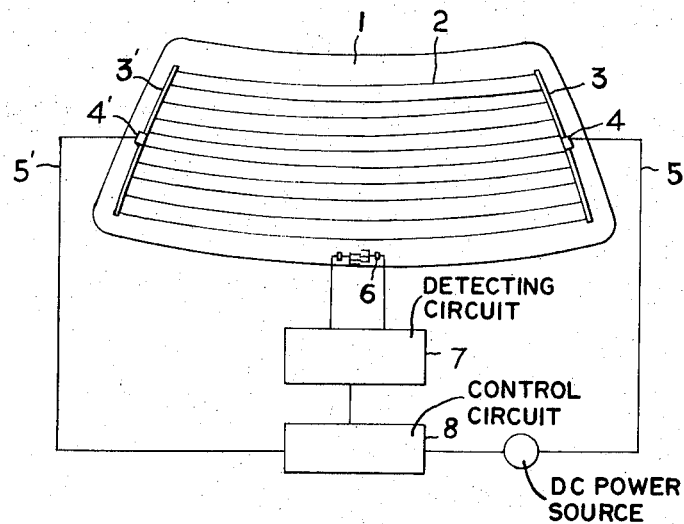
FIG. 1 is a plan view of a rear window of an automobile incorporating a preferred embodiment of this invention.

Referring now to the drawing wherein like reference numerals designate identical, or corresponding parts throughout the several views, and more particularly to FIG. 1 thereof wherein an illustrative preferred embodiment of the defogging glass plate according to this invention is shown as including a glass plate 1, a plurality of electric resistance strips 2, a pair of bus bars 3 and 3', a pair of terminals 4 and 4', lead lines 5 and 5', a sensor 6, a detecting circuit 7 and a control circuit 8.

The plurality of electric resistance strips (or electroconductive lines) 2 are arranged on the glass plate 1 with substantially the same gap between each other. The pair of bus bars 3 and 3' have a relatively broad strip shape and are respectively connected in parallel to the electric resistance strips 2, for enabling an electric current, such as a D. C. current, to be applied thereto. The pair of bus bars 3 and 3' are further connected through a respective one of the terminals 4 and 4' and the lead wires 5 and 5' to the control circuit 8. The plurality of electric heating elements 2, such as the electroconductive lines or the electric resistance strips shown in FIG. 1, may suitably be made of an electroconductive material having high adhesiveness, high abrasion resistance and high chemical stability.

It has been found preferable to use a ceramic electroconductive coating material for the electric resistance heating elements 2 and the same may be made as follows. An electroconductive frit is made of glass powder having a low melting point and fine particles of a conductive metal, such as silver. The electroconductive frit is admixed and kneaded with an organic binder and the resulting paste or suspension thereof is printed or coated on the glass plate, such as by screen-printing. The printed or coated glass plate is then heated at a high temperature to thereby form the electric resistance heating elements 2 on the glass plate.

By way of example, typical commercial compositions used for preparing the ceramic electroconductive coating material are as follows:

COMPOSITION 1

| INGREDIENT | PERCENT BY WEIGHT |
| --- | --- |
| PbO | 7.5 |
| $B_2O_3$ | 1.0 |
| $SiO_2$ | 1.5 |
| Finely divided silver | 70.0 |
| French Fat Oil | 12.5 |
| Turpentine | 7.5 |

COMPOSITION 2

| INGREDIENT | PERCENTAGE BY WEIGHT |
| --- | --- |
| Finely divided silver | 72.6 |
| PbO | 9.3 |
| $SiO_2$ | 1.7 |
| $B_2O_3$ | 1.4 |
| $H_2O$ | 7.5 |
| Ethyl Alcohlo | 7.5 |

According to the present invention, it is also possible to insert a plurality of electric resistance wires, such as nickel-chromium wires, between a plied glass plate and to utilize the same as the electric heating elements 2.

It should be understood that in order to maintain clear visibility and desirable mechanical strength, the width of the printed lines or strips utilized for the heating elements 2 should preferably be in the range of substantially 0.3 - 1.0 mm. Each gap between the printed lines or strips is preferably in a range of about 20-40 mm.

The sensor 6 is connected to the detecting circuit 7 which in turn is connected to the control circuit 8. The detecting circuit 7 will be closed by an actuation of the sensor 6, and the control circuit 8 will be actuated by an operation of the detecting circuit 7. When the sensor 6 is actuated the electric heating elements will be heated so as to remove any moisture on the surface of the glass plate 1.

Figure 2:
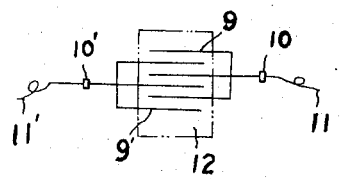
FIG. 2 is a schematic view of a sensor used for the non-fog glass window of this invention.

The sensor 6 is fixed on the surface of the glass plate 1 and is shown with reference to FIG. 2 as including a pair of electrodes 9 and 9' each having a gap, such as in the range of about 0.1 - 10.0 mm., a pair of terminals 10 and 10' and a pair of lead wires 11 and 11'. The pair of lead wires 11 and 11' are connected to the detecting circuit 7. It should be understood that when the gap distance of the electrodes 9 and 9' is in the range of about 0.1 - 10.0 mm that the sensitivity of the sensor 6 is suitable for practical use. Thus, for example, if the gap is less than 0.1 mm, an electric current will leak between the electrodes in response to the condensing of a small amount of moisture such that the sensitivity of the sensor is too high for practical use. On the other hand, if the gap distance is higher than 10.0 mm, the sensitivity of the sensor will be too low for practical use. The invention is not limited to the use of a single pair of electrodes and alternatively, additional pairs of electrodes can be used in the sensor.

Figure 3:
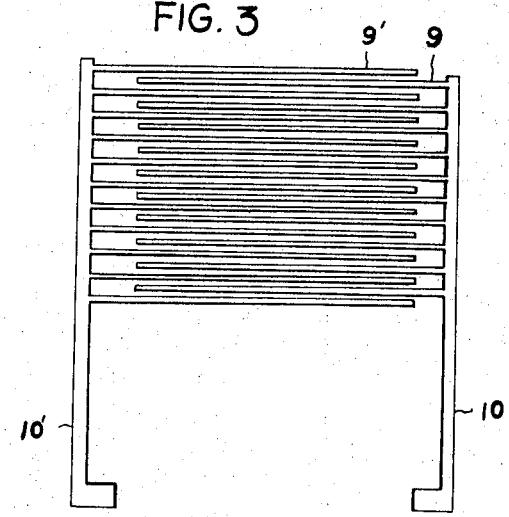
FIG. 3 is an enlarged view of the electrodes of the sensor of FIG. 2.

Thus, a typical pattern for a sensor having a plurality of pairs of electrodes is shown in FIG. 3, wherein two branches 10 and 10' of 25 cm. length are shown as being provided and serve as a cathode and an anode for the sensor 6. If the gap distance between the electrodes is set by example to be 0.4 mm. and the maximum electrical resistance for actuating the sensor 6 is set by example to be 1 MΩ, then the sensor will thereby be actuated, when the glass plate is slightly blurred (cloudiness is observed).

If the gap distance between the electrodes is set to 0.8 mm. the sensor 6 will be actuated, when the glass plate is moderately blurred (water drops are observed on the glass plate). By still further example, if the gap distance between the electrodes is set to be 1.6 mm. then the sensor 6 will be actuated when the glass plate is very blurred (continuous water drops are observed on the glass plate).

In view of the above, it is especially preferable to have the gap distance of the electrodes in the sensor substantially in the range of 0.4 - 1.2 mm.

It should be understood that while the sensor 6 has been shown in FIGS. 2 and 3 as having a particular shape that the invention is not so limited and the same can be of various shapes which are capable of detecting a change of electric current or impedance between the gap of the electrodes in response to a condensing of moisture on the surface of the glass plate.

Thus, for example, it is possible to use electrodes each of which are attached to a bus bar and have a plurality of branches. Likewise, it is possible to use electrodes having a curved or bent shape.

The electrodes 9 and 9' can be electric resistance wires, electroconductive lines or strips having a suitable electric resistance. It is especially preferable to use electrodes having high adhesiveness, high mechanical strength and chemical stability.

Generally, electrodes made of metals having metal ions which can easily migrate from an anode electrode to a cathode electrode and thereby result in an electrical short circuit when moisture is condensed in the gap of electrodes are not suitable. Thus, when electrodes made of metal are used, as the metal ions migrate from an anode electrode to a cathode electrode, the metal will be deposited on the cathode and after a long period of time will increase towards the direction of the anode electrode so as to cause an electrical short circuit and thereby render the sensor inoperable.

Accordingly, it is preferable to use electrodes made of metals which have non-migrative ions, such as Au, Pd, Pt and mixtures thereof, mixtures of such metals and glass frit, electroconductive metal oxides, such as $RuO_2$, $SnO_2$, $In_2O_3$ and the like or mixtures of such metal oxides and glass frit.

The following is a typical example of an electrode used as the sensor.

100 parts by weight of finely crushed $RuO_2$ powder having an average particle diameter of $4\mu$ is uniformly admixed with 61 parts by weight of glass frit having an average particle diameter of $1.4\mu$ and which consists of 74.0 wt % of PbO, 10.9 wt % $A_2O_3$, 10.8 wt% of $B_2O_3$, and 3.82 wt% of $SiO_2$. 39 parts by weight of an organic solvent of butyl carbitol acetate is then further added and kneaded at 25°C at 10 rpm. to thereby result in 15,700 cps of paste. The resulting paste is screen-printed on the glass plate by using a silk screen in a pattern such as is shown in FIG. 3, and is dried at approximately 200°C in air for 10 minutes, and then heated at approximately 600°C, 650°C or 700°C for 3 minutes, so as to thereby form the moisture detecting electrodes.

The area of resistance of the electrode may be 60 ohms per square inch. It has been found preferable to use electrodes made of 50 - 90 wt percent of $RuO_2$ and substantially 50 - 10 wt percent of glass frit.

In order to detect a small amount of condensed moisture in the vicinity of the gap of the electrodes 9 and 9' of the sensor 6, it is preferable to form a moisture detecting sensitivity amplifying region 12 on the surface of the glass plate 1, as shown in FIG. 2. The moisture detecting sensitivity amplifying region 12 can be formed by grinding the surface of the glass plate 1 by a conventional sandblast method, or by imparting hydrophilic properties by coating or treating with a hydrophilic material, such as a synthetic resin. The electrodes of the sensor are preferably printed or coated on the moisture detecting sensitivity amplifying region 12.

In operation, when no moisture is condensed within the gap of the electrodes 9 and 9' on the glass plate 1, the sensor 6 will not be electrically connected and thereby an open circuit is formed. When moisture is condensed so as to form a water film within the gap of the electrodes 9 and 9', the sensor 6 will be electrically closed by the water film so as to provide a closed circuit. The detecting circuit 7 serves to detect any change in the electric current within the gap between the electrodes 9 and 9'. Thus, when no water film is formed on the sensor, the detecting circuit 7 will be opened and the detected electric current will be zero. However, in the presence of water, a predetermined amount of electric current will be supplied in the gap between the electrodes and if a sufficient level of water is present, the detecting circuit will be closed by a relay, such as a diode and a thyristor, whereby the control circuit 8 will supply an electric current through the bus bars 3 and 3' to the electric heating elements 2 for heating the same to provide a defogging effect on the glass plate 1.

It should be understood that the maximum electrical resistance of the sensor 6 used for detecting moisture can be selected in the range of substantially 100 K$\Omega$ to 10M$\Omega$ depending on the resistance of the moisture condensed on the glass plate 1.

It should be further understood that when the moisture detecting sensitivity amplifying region 12 is provided that even though a small amount of moisture is condensed, water drops will not be formed, but instead a continuous water film will be formed. As such, an electric current is supplied within the gap between the electrodes 9 and 9', such that a small amount of water can be detected with high sensitivity as a change of electric current or impedance between the electrodes.

Moreover, when the moisture detecting sensitivity amplifying region 12 is prepared by applying a hydrophilic material or the like, the water condensed on the region will be spread over the entire area thereof becuase of the decrease in the surface tension of the water, such that a thin water film is formed, instead of water drops, and such that the sensitivity of the sensor 6 is greatly increased. As stated above it should now be apparant that when the moisture detecting sensitivity amplifying region is formed on the glass plate 1 that any water which could cause cloudiness on the glass plate and thereby obstruct visibility can be detected with high sensitivity. It is therefore especially preferable to form the moisture detecting sensitivity amplifying region together with the electrodes as a sensor.

It should also be understood that when the sensitivity amplifying region is formed at the position of the sensor, a constant sensitivity can be provided, even though the surface is not clean.

By way of example, when the sensor having the typical pattern shown in FIG. 3 is provided, the anode and cathode branches are of 26 cm. in distance, the sensitivity amplifying region is formed by sandblasting, and the maximum electrical resistance for actuating the sensor is set at 1 M$\Omega$, it was found that if the gap between the electrodes was set to 0.4 mm that the sensor would actuate just before the glass plate began to blur (no cloudiness is observed). It was found that if the gap between the electrodes was set to 0.8 mm that the sensor would actuate when the glass plate was slightly blurred (cloudiness is observed). It was found that if the gap between the electrode was set to 1.6 mm that the sensor would actuate when the glass plate was very blurred (complete cloudiness is observed).

It should now be apparant that in accordance with the defogging glass plate of this invention, when cloudiness is formed on a glass plate by moisture or the like, the same is automatically detected by a sensor device whereby electric heating elements provided on the glass plate are automatically heated to immediately remove any such cloudiness formed.

Obviously, numerous modifications and variations of the present invention are possible in light of the above teachings. It is therefore to be understood that within the scope of the appended claims the invention may be practiced otherwise than as specifically described herein.

What is claimed as new and desired to be secured by Letters Patent of the United States is:

1. A defogging glass plate which comprises an electric heating element mounted in contact with said glass plate and adapted to be coupled to a source of electric power, a sensor having a plurality of electrodes which are arranged in parallel with gaps therebetween and which are fitted on the surface of said glass plate for automatically detecting any formation of a water film within said gaps, a detecting electric circuit means coupled to said sensor and to said electric heating element for detecting a change of electric current due to a change of impedance within said gaps between said electrodes and for controlling the application of power from said source to said electric heating element when a water film is formed within said gaps wherein said electrodes of said sensor are a calcinated composition formed by printing a composition of glass frit and $RuO_2$.

2. A defogging glass-plate of claim 1, wherein said electrodes are made of substantially 50 – 90 percent by weight of $RuO_2$ and of substantially 10 – 50 percent by weight of glass frit.

* * * * *